Patented Apr. 10, 1934

1,954,482

UNITED STATES PATENT OFFICE 1,954,482

PRODUCTION OF ISOVIOLANTHRONE

Francis Knowles, Wilmington, Del., assignor to E. I. du Pont de Nemours & Company, Wilmington, Del., a corporation of Delaware No Drawing. Application August 31, 1932, Serial No. 631,276

5 Claims. (Cl. 260—61)

This invention relates to the manufacture of isoviolanthrone and more particularly refers to the production of this product in an exceptionally pure form, by a much simpler process than was heretofore possible.

Heretofore isoviolanthrone was produced by an alkaline condensation of benzanthrone derivatives, the condensed products being air-oxidized and the isoviolanthrone separated from the by-products by numerous crystallizations and extractions.

It is an object of the present invention to produce isoviolanthrone of exceptional purity by a much simpler process than the customary one. A further object is to obtain this pure isoviolanthrone by a process wherein the numerous crystallization and extraction steps of prior processes are eliminated. Additional objects will appear hereinafter.

These objects are attained by the present invention wherein derivatives of benzanthrone, which upon condensation produce isoviolanthrone, are fused in alcoholic alkali hydroxide, the condensation products diluted with water and the resulting solution filtered, meanwhile preventing substantial oxidation of the condensation products.

The invention may be more completely understood by reference to the following illustrative examples in which the quantities are stated in parts by weight.

Example 1

To a melt consisting of 900 parts of alcohol, 1000 parts of potassium hydroxide and 144 parts of metallic sodium, was added 500 parts of Bz-1-chloro-benzanthrone at 120° C. The mass was then heated to 140-145° C. and this temperature maintained for one-half hour. The melt was then drowned in 20,000 parts of cold water and the resultant slurry allowed to stand for 12 hours without agitation. It was then heated to 80-90° C. as rapidly as possible and filtered at once. The cake was washed with hot water until the filtrate was colorless.

The residue was a purified isoviolanthrone which when chlorinated gave a redder shade of violet than does the material obtained by air-oxidation of the entire mass. It dissolved to a clear green in sulfuric acid, and a clear blue in alkaline hydrosulfite.

The material obtained from the filtrate by air-oxidation dyed cotton a much bluer shade than does violanthrone, dissolved in concentrated sulfuric acid with a dirty brown color and became soluble in ortho-dichlorbenzene and nitrobenzene when chlorinated.

Example 2

To a melt containing 900 parts of alcohol, 1000 parts of potassium hydroxide and 144 parts of metallic sodium, was added 500 parts of Bz-1:Bz-1'-benzanthronyl-selenide at 120° C. The melt was then heated to 135-140° C. and this temperature maintained for 1½ hours. It was then drowned in 20,000 parts of water, heated as rapidly as possible to 80-90° C. and filtered at once. The cake was washed with 2% NaOH solution until the filtrate become colorless. This residue also dissolved in sulfuric acid and alkaline hydrosulfite with the same colors as in Example 1.

The residue was a highly purified isoviolanthrone which, when chlorinated, gave redder shades of violet than were possible to obtain from the material isolated by complete air-oxidation of the entire mass. It dissolved in sulfuric acid to give a clear green color.

The material obtained from the filtrate by air-oxidation dissolved in a dilute alkaline hydrosulfite solution with a blue color and a deep reddish brown fluorescence, from which cotton was dyed a much bluer shade than that obtained from violanthrone. It dissolved in sulfuric acid with a dirty brown color and became soluble in ortho-dichlorbenzene and nitrobenzene when chlorinated.

Example 3

To a melt consisting of 900 parts of alcohol and 1350 parts of potassium hydroxide was added 500 parts of Bz-1:Bz-1'-benzanthronyl-selenide at 120° C. The temperature was raised to 135° C., maintained for 1½ hours and the melt then drowned in 20,000 parts of water. The resultant slurry was heated to 80-90° C. and filtered at once, the cake being washed with a 2% sodium hydroxide solution until the filtrate became colorless.

The residue was a highly purified isoviolanthrone which, when chlorinated, gave higher yields of redder shades of violet than was possible to obtain from the completely oxidized material.

The material obtained from the filtrate appeared to be identical with that described in Example 2.

In carrying out the process described herein numerous benzanthrone derivatives in addition to those mentioned in the above examples may be used. Any of the well known derivatives which upon condensation produce isoviolanthrone may be used with very satisfactory results.

These derivatives are too well known to require enumeration, representative examples being Bz-1-brombenzanthrone, Bz-1:Bz-1'-benzanthronyl sulfide, and Bz-1:Bz-1'-benzanthronyl telluride.

The conditions and assistants used in carrying out the herein-described invention may be varied within rather wide limits without departing from the scope of the invention. For instance, the water in which the alkaline fusion is submerged may contain sodium sulfide, sodium hydrosulfite or sodium bisulfite, or it may contain mixtures of these and/or similar compounds. The submerged solution may be allowed to stand for an appreciable period of time before filtering, as in Example 1, or it may be filtered almost immediately, as in Examples 2 and 3. The filter cake may be washed with water or it may be washed with a dilute sodium hydroxide solution. Metallic sodium may be dispensed with when condensing certain compounds, particularly Bz-1:Bz-1'-benzanthronyl-selenide. These modifications are well known to one skilled in the art and no difficulty should be encountered in determining whether to add alkaline salts to the water in which the fusion is submerged, whether to allow the submerged solution to stand or to filter immediately, whether to wash the filter cake with water or a dilute caustic solution, or whether to carry out the condensation in the presence of metallic sodium.

Alkali hydroxides or mixtures thereof may be used in carrying out the condensation of the benzanthrone derivatives. However, the use of potassium hydroxide in this alkaline condensation is preferable, since the results obtained thereby are superior to those obtained by the use of sodium hydroxide or mixtures of sodium and potassium hydroxide.

Care should be taken to prevent substantial oxidation of the condensation products while carrying out the previously mentioned processes. A small amount of oxidation will not seriously affect the purity of the isoviolanthrone produced. However, this oxidation should be confined to a minimum since the leuco forms of isoviolanthrone and the by-product impurity exhibit a marked difference in solubility but upon oxidation this difference in solubility becomes less pronounced and makes a thorough separation more difficult.

The processes which form the subject matter of the present invention are much simpler than those heretofore used since they eliminate the tedious steps of numerous crystallizations and extractions. In addition to eliminating these numerous and tedious steps of prior processes, the present invention produces a product which is much purer and more desirable from a commercial standpoint than isoviolanthrones now on the market.

As many apparently widely different embodiments of this invention may be made without departing from the spirit and scope thereof, it is to be understood that I do not limit myself to the specific embodiments thereof except as defined in the appended claims.

I claim:

1. In the process for producing pure isoviolanthrone by the alkaline fusion of benzanthrone derivatives selected from the group consisting of Bz-1-chlorobenzanthone, Bz-1-brombenzanthrone, Bz-1:Bz-1'-benzanthronyl-selenide, Bz-1:Bz-1'-benzanthronyl-sulfide, and Bz-1:Bz-1'-benzanthronyl-telluride, and subsequent drowning of the fused mass in water, the step which comprises filtering the diluted alkaline fusion before substantial oxidation of the condensation products has taken place.

2. A process for producing pure isoviolanthrone which comprises fusing in alcoholic alkali hydroxide a benzanthrone derivative selected from the group consisting of Bz-1-chlorobenzanthrone, Bz-1-brombenzanthrone, Bz-1:Bz-1'-benzanthronyl-selenide, Bz-1:Bz-1'-benzanthronyl-sulfide, and Bz-1:Bz-1'-benzanthronyl-telluride, diluting the fusion and filtering the dilute solution, meanwhile preventing substantial oxidation of the condensation products.

3. A process for producing pure isoviolanthrone which comprises fusing in alcoholic potassium hydroxide a benzanthrone derivative selected from the group consisting of Bz-1-chlorobenzanthrone, Bz-1-brombenzanthrone, Bz-1:Bz-1'-benzanthronyl-selenide, Bz-1:Bz-1'-benzanthronyl-sulfide, and Bz-1:Bz-1'-benzanthronyl-telluride, diluting the fusion and filtering the dilute solution, meanwhile preventing substantial oxidation of the condensation products.

4. A process for producing pure isoviolanthrone which comprises fusing in alcoholic potassium hydroxide Bz-1:Bz-1'-benzanthronyl-selenide, diluting the fusion and filtering the dilute solution, meanwhile preventing subsantial oxidation of the condensation products.

5. A process for producing pure isoviolanthrone which comprises fusing in a mixture of sodium and alcoholic potassium hydroxide Bz-1-chlorobenzanthrone, diluting the fusion and filtering the dilute solution, meanwhile preventing substantial oxidation of the condensation products.

FRANCIS KNOWLES.